US009638915B2

(12) United States Patent
Chang et al.

(10) Patent No.: US 9,638,915 B2
(45) Date of Patent: May 2, 2017

(54) PROJECTOR AND COLOR WHEEL MODULE DUST REMOVING METHOD

(71) Applicants: QISDA OPTRONICS (SUZHOU) CO., LTD., Suzhou, Jiangsu Province (CN); QISDA CORPORATION, Taoyuan (TW)

(72) Inventors: Wei-Chun Chang, New Taipei (TW); Tsung-Hsun Wu, Taoyuan (TW)

(73) Assignees: QISDA OPTRONICS (SUZHOU) CO., LTD., Suzhou (CN); QISDA CORPORATION, Taoyuan (TW)

( * ) Notice: Subject to any disclaimer, the term of this patent is extended or adjusted under 35 U.S.C. 154(b) by 0 days.

(21) Appl. No.: 14/983,552

(22) Filed: Dec. 30, 2015

(65) Prior Publication Data

US 2016/0195715 A1 Jul. 7, 2016

(30) Foreign Application Priority Data

Jan. 7, 2015 (TW) .............................. 104100443 A

(51) Int. Cl.
*G02B 27/00* (2006.01)
*G02B 26/00* (2006.01)
*G02B 7/00* (2006.01)
*H04N 9/31* (2006.01)

(52) U.S. Cl.
CPC ......... *G02B 27/0006* (2013.01); *G02B 7/006* (2013.01); *G02B 26/008* (2013.01); *H04N 9/3114* (2013.01)

(58) Field of Classification Search
CPC ....... F21S 10/02; G02B 26/008; G02B 7/006; G02B 27/0006; G03B 17/12; H04N 9/3114; H04N 9/3117
USPC ............................................ 353/84; 359/892
See application file for complete search history.

(56) References Cited

U.S. PATENT DOCUMENTS

| 8,678,597 B2* | 3/2014 | Nishimura | G03B 21/16 353/119 |
| 2007/0242950 A1* | 10/2007 | Tenmyo | G02B 27/0006 396/463 |
| 2016/0070095 A1* | 3/2016 | Hsu | G02B 26/008 353/31 |

* cited by examiner

*Primary Examiner* — William C Dowling

(57) ABSTRACT

A projector includes a color wheel module and a processing unit. The color wheel module includes a color wheel including multiple color-filtering areas for providing multiple colors of light; a shaft connected to the color wheel for driving the color wheel to spin and including a reflecting surface and a mark; a fixing part disposed corresponding to the shaft; a light transceiver set on the fixing part for emitting light and receiving the light reflected by the shaft; and a vibrator set on the fixing part for vibrating when meeting a vibrating condition to shake off dust on the color wheel, the shaft and/or the light transceiver. The processing unit is coupled to the light transceiver for analyzing a spinning angle of the color wheel according to the light received by the light transceiver.

10 Claims, 5 Drawing Sheets

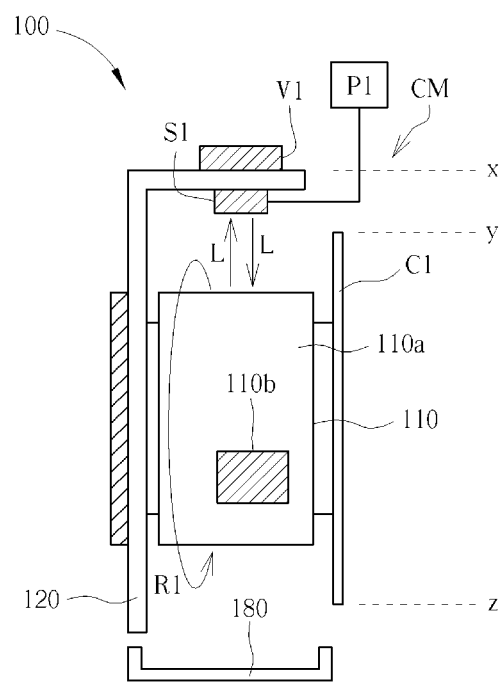
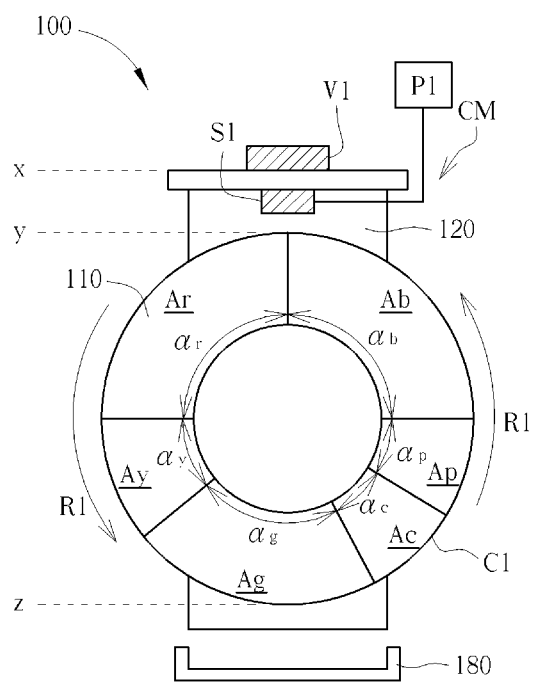
FIG. 1
FIG. 2

PROJECTOR AND COLOR WHEEL MODULE DUST REMOVING METHOD

CROSS REFERENCE TO RELATED APPLICATION

This application claims priority to Taiwan Patent Application No. 104100443, filed Jan. 7, 2015, and incorporated herein by reference in its entirety.

BACKGROUND OF THE INVENTION

1. Field of the Invention

The present application relates to a projector, and more particularly, a projector using a vibrator to shake dust off a color wheel module.

2. Description of the Prior Art

A color wheel module is often used in a digital light processing (DLP) projector, and is used for providing multiple colors of light via a color wheel with multiple color-filtering areas by spinning the color wheel and filtering light through the color wheel. A variety of visible colors of light are generated by mixing different colors of light provided by the color wheel. A light sensor is used for detecting a spinning angle of the color wheel. Hence, the detection sensitivity and the effect of light-filtering may be better when the color wheel is kept clean. However, in an environment with a high density of dust or serious air pollution, the color wheel module is easily polluted by dust landing on it, and the effect of light-filtering and the detection sensitivity of the light sensor are worsened. In severe cases, the DLP projector may fail to display any frame.

SUMMARY OF THE INVENTION

An embodiment of the present invention discloses a projector including a color wheel module and a processing unit. The color wheel module includes a color wheel, a shaft, a fixing part, a light transceiver and a vibrator. The color wheel includes multiple color-filtering areas configured to provide multiple colors of light. The shaft is connected to the color wheel and configured to drive the color wheel to spin, comprising a reflecting surface and a mark. The fixing part is disposed corresponding to the shaft. The light transceiver is set on the fixing part and configured to emit light and receive the light reflected by the shaft. The vibrator is set on the fixing part and configured to vibrate when meeting a vibrating condition so as to shake off dust on the color wheel, the shaft and/or the light transceiver. The processing unit is coupled to the light transceiver and configured to analyze a spinning angle of the color wheel according to the light received by the light transceiver.

Another embodiment of the present invention discloses a method configured to clean dust on a color wheel module. The color wheel module includes a fixing part, a light transceiver, a shaft, a color wheel and a vibrator. The light transceiver is set on the fixing part. The shaft includes a reflecting surface and a mark. The color wheel is connected to the shaft. The vibrator is set on the fixing part. The method includes spinning the shaft, the light transceiver transmitting light and receiving the light reflected by the shaft, the vibrator vibrating when a vibrating condition is met so as to shake dust off the light transceiver, the shaft and/or the color wheel. The reflecting surface has a first reflectivity, and the mark has a second reflectivity being lower than the first reflectivity.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates a side view of a projector and a color wheel module of the projector according to an embodiment of the present invention.

FIG. 2 illustrates a front view of the projector and the color wheel module shown in FIG. 1.

DETAILED DESCRIPTION

Figure 3:
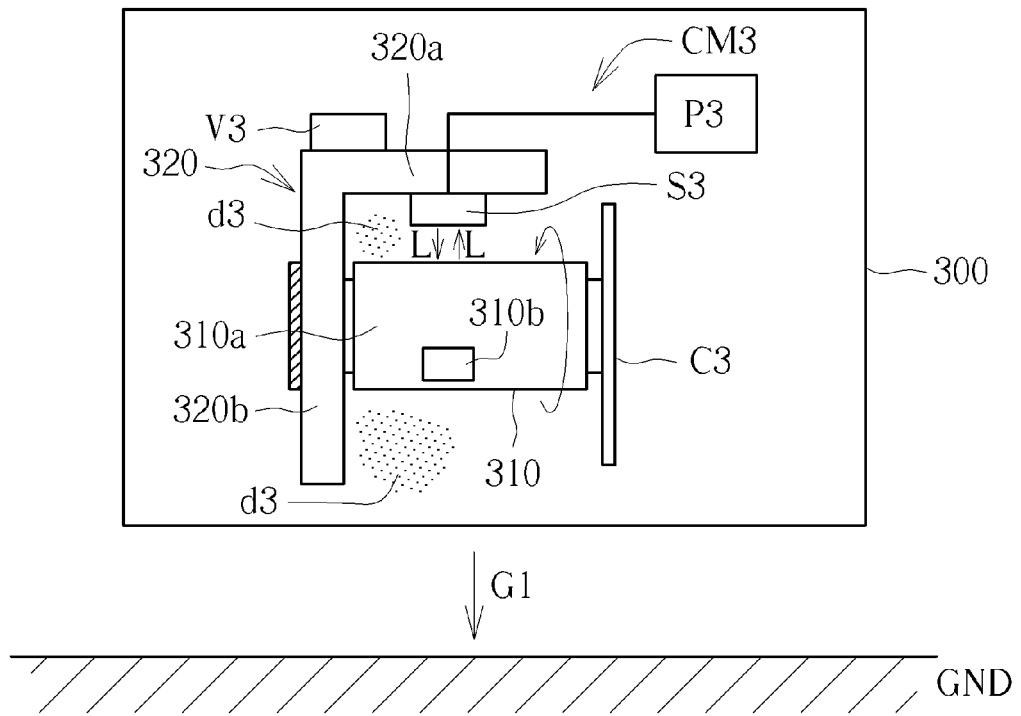
FIG. 3 illustrates relative positions of a color wheel module and a vibrator according to another embodiment of the present invention.

FIG. 1 illustrates a side view of a projector 100 and a color wheel module CM of the projector 100 according to an embodiment of the present invention. FIG. 2 illustrates a front view of the projector 100 and the color wheel module CM according to the embodiment of the present invention. The relative positions of devices shown in FIGS. 1 and 2 can be aligned by using reference lines x, y and z. The projector 100 includes the color wheel module CM and a processing unit P1. The color wheel module includes a color wheel C1, a shaft 110, a fixing part 120, a light transceiver S1 and a vibrator V1. The color wheel includes multiple color-filtering areas Ab, Ar, Ay, Ag, Ac and Ap. The color wheel C1 may be spun in a light-filtering process for providing multiple colors of light via the multiple color-filtering areas Ab to Ap. According to the embodiment shown in FIG. 2, a six-color color wheel is taken for an example. The color wheel C1 of FIG. 2 includes a blue color-filtering area Ab (with an angle $\alpha_b$), a red color-filtering area Ar (with an angle $\alpha_r$), a yellow color-filtering area Ay (with an angle $\alpha_y$), a green color-filtering area Ag (with an angle $\alpha_g$), a cyan color-filtering area Ac (with an angle $\alpha_c$) and a light-transmisive area Ap (with an angle $\alpha_p$). However, the color wheel of the present invention is not limited to a six-color color wheel; it is allowed to be a four-color color wheel or an appropriate color wheel designed according to an attempted color performance of the projector. The shaft 110 is connected to the color wheel C1 and used for driving the color wheel C1 to spin. The direction of spin may be (but not limited to) a direction of spin R1 as shown in FIGS. 1 and 2, and an direction opposite to the direction of spin R1 is also allowed. The shaft 110 includes a reflecting surface 110a and a mark 110b. The reflecting surface 110a has a first reflectivity, and the mark 110b has a second reflectivity being lower than the first reflectivity. For example, a silver reflecting material (e.g. a metal thin-film material) may be covered or electroplated on the shaft 110 so as to form the reflecting surface 110a, and a dark light-absorbing material (e.g. a dark organic chemical plastic material with low reflectivity) may be stuck or fixed on the shaft 110 to be the mark 110b. The light transceiver S1 may include a light source and a light sensor for emitting and receiving the light L. The fixing part 120 may be disposed corresponding to the position of the shaft 110. The light transceiver S1 may be set on the fixing part 120 to emit the light L and receive the light L reflected by the shaft 110. The vibrator V1 may be set on the fixing part 120 and configured to vibrate when meeting a vibrating condition so as to shake off dust on the color wheel C1, the shaft 110 and/or the light transceiver S1. The vibrating condition is described below. The processing unit P1 is coupled to the light transceiver S1 and configured to analyze a spinning angle of the color wheel C1 according to the light L received by the light transceiver S1.

The mechanism for the processing unit P1 to analyze the spinning angle of the color wheel C1 according to the light L received by the light transceiver S1 is as follows. The light transceiver S1 may receive a light signal corresponding to a larger luminosity when the shaft 110 spins and the light L emitted from the light transceiver S1 reaches the reflecting surface 110a (with the higher first reflectivity), and the light transceiver S1 may receive another light signal corresponding to a smaller luminosity when the shaft 110 spins and the light L emitted from the light transceiver S1 reaches the mark 110b (with the lower second reflectivity). Since the light transceiver S1 may emit the light L continuously during the light-filtering process, the light transceiver S1 may receive the reflected light L continuously, and the luminosity of the received light L may vary according to the emitted light L reaching the reflecting surface 110a or the mark 110b. A corresponding program may be installed in the processing unit P1 previously, and angles of all color-filtering areas (e.g. the angles $\alpha_b$ to $\alpha_r$) may be written in the program so as to calculate the spinning angle of the color wheel C1 according to the luminosity and receiving time of the received light L and the angle of each color-filtering area.

When the projector operates under an environment with a high density of dust, serious air pollution or a haze problem, dust may land on the reflecting surface 110a, the mark 110b, the light transceiver S1 and/or the color wheel C1 so that the effect of light-filtering may be deteriorated, and the light transceiver S1 may not emit and receive light normally. Hence, the vibrator V1 may vibrate when meeting a vibrating condition. The said vibrating condition may include an amount of operation time of the projector being a predetermined amount of time (e.g. 100 hours), the number of times of operating the projector being a predetermined number (e.g. 150), an incorrect operation of the projector occurring (e.g. the light transceiver S1 receiving no reflecting light after the shaft 110 has spun for fifty laps), the projector receiving an instruction from a user (e.g. a user pressing a "vibrating to clean dust" functional key on a projector), the time being a predetermined time (e.g. always vibrating at 7 A.M. on every Wednesday) and/or an amount of time since the last cleaning being a predetermined amount of time (e.g. 120 hours). The projector 100 may include a dust collecting part 180 for collecting the dust shaken off by the vibrator V1. The dust collecting part 180 may be a recession, a hole, an adhesive part and/or a dust-sucking device so as to collect, adhere and/or suck the dust shaken off. The reflecting surface 110a, the mark 110b, the light transceiver S1 and/or the color wheel C1 may thus get rid of dust. The dust collecting part 180 maybe designed to be removable for being taken away, cleaned and then put back easily.

FIG. 3 illustrates relative positions of a color wheel module CM3 and a vibrator V3 according to another embodiment of the present invention. The projector 300 shown in FIG. 3 includes a color wheel CM3 and a processing unit P3. Similar to the color wheel module CM of FIG. 1, the color wheel module CM3 includes a fixing part 320, a light transceiver S3 (connected to the fixing part 320 and used for emitting light L and receiving the reflected light L), a vibrator V3 and a color wheel C3. As shown in FIG. 3, the fixing part 320 includes a first surface 320a and a second surface 320b. According to an embodiment of the present invention, for avoiding that dust d3, the dust shaken off by the vibrator, accumulates at a lower part of the color wheel module CM3, the vibrator V3 may be preferably disposed at a surface of a higher position instead of a surface of a lower position. As shown in FIG. 3, the vibrator V3 may be set on the first surface 320a (of a higher position) instead of the second surface 320b (of a lower position). The mentioned "higher position" and "lower position" are defined by referring to a direction of earth gravity G1. Taking what is shown in FIG. 3 as an example, a second distance between the second surface 320b and a ground GND is shorter than a first distance between the first surface 320a and the ground GND, hence the position of the second surface 320b may be defined to be higher than the position of the first surface 320a, and the vibrator V3 is set on the first surface 320a. According to another embodiment of the present invention, when the vibrator V3 is set on the first surface 320a of the fixing part 320, a circuit board (e.g. a printed circuit board) for controlling the light transceiver S3 may be also set on the first surface 320a, and the vibrator V3 may be fixed with the circuit board by using screws or welding. The relative positions of the color wheel module CM3, the vibrator V3 and the ground GND shown in the embodiment of FIG. 3 may be practical when the projector 300 is placed on a plane (e.g. being put on a desk) or mounted on a ceiling.

Figure 4:
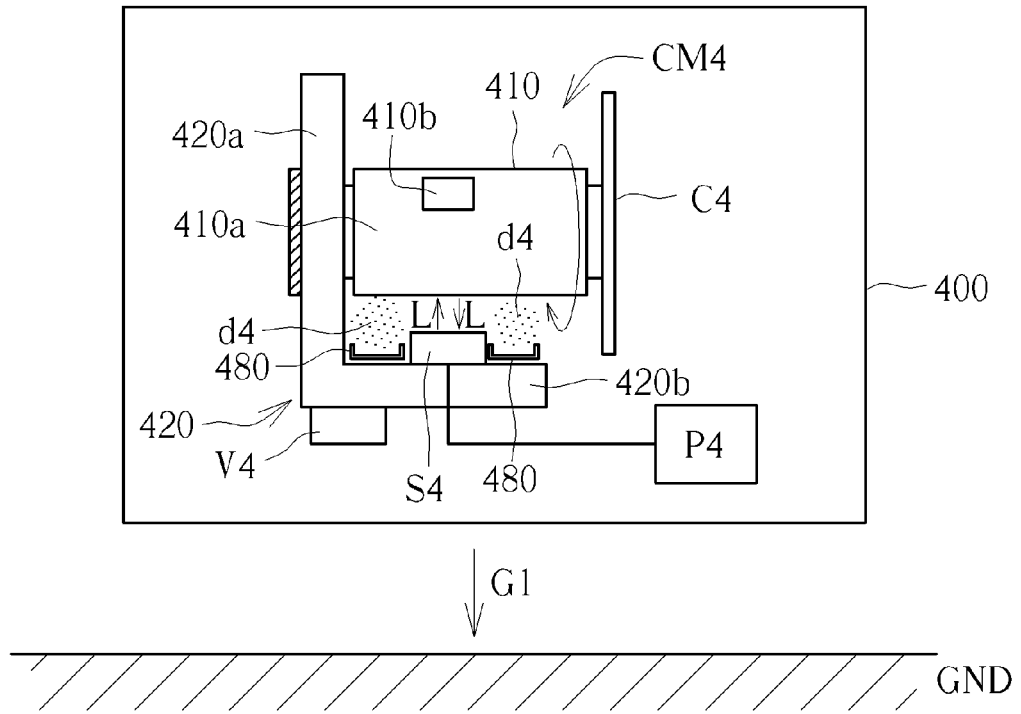
FIG. 4 illustrates relative positions of a color wheel module and a vibrator according to yet another embodiment of the present invention.

FIG. 4 illustrates relative positions of a color wheel module CM4 and a vibrator V4 according to yet another embodiment of the present invention. In FIG. 4, the vibrator V4 is set on a surface with a lower position that is a second surface 420b. Dust d4 shaken off by the vibrator V4 may land and accumulate at a lower part of the color wheel module CM4 so that the effect of cleaning dust is not ideal. Hence, when the relative positions of the color wheel module CM4 and the vibrator V4 are shown as FIG. 4, a dust collecting part 480 may be set for collecting the dust d4. The operation of a light transceiver S4, a processing unit P4, a shaft 410, a reflecting surface 410a, a mark 410b and a color wheel C4 is similar to the description above, so it is not repeated.

Figure 5:
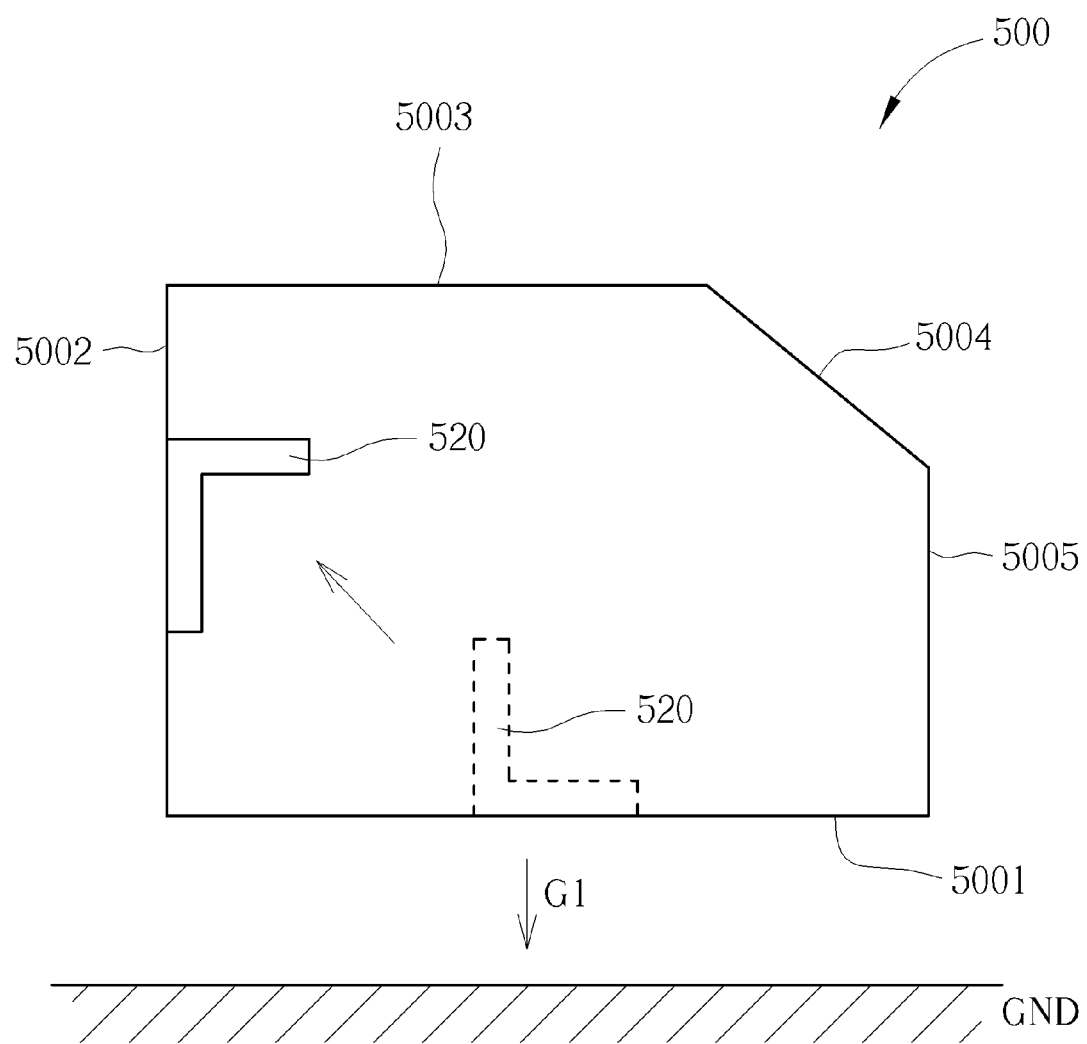
FIG. 5 illustrates relative positions of a fixing part and a projector according to an embodiment of the present invention.

FIG. 5 illustrates relative positions of a fixing part 520 and a projector 500 according to an embodiment of the present invention. As shown in FIG. 5, the projector 500 includes a first side 5001 being closest to the ground GND, a second side 5002, a third side 5003, a fourth side 5004 and a fifth side 5005. As described above, for avoiding the dust shaken off accumulating at a lower part of the projector 500, the fixing part 520 may be preferably set on a side different from the first side 5001 such as the second side 5002 to the fifth side 5005. In FIG. 5, the fixing part 520 is set on the second side 5002 as an example, but the fixing part 520 is also allowed to be set on the third side 5003, the fourth side 5004 and the fifth side 5005. The projector 500 having five sides 5001-5005 is merely an embodiment of the present invention; it is used for interpreting the present invention instead of limiting type of projector disclosed by the present invention. The relative positions of the fixing part 520, the projector 500 and the ground GND shown in the embodiment of FIG. 5 may be practical when the projector 500 is placed on a plane (e.g. being put on a desk) or mounted on a ceiling.

Figure 6:
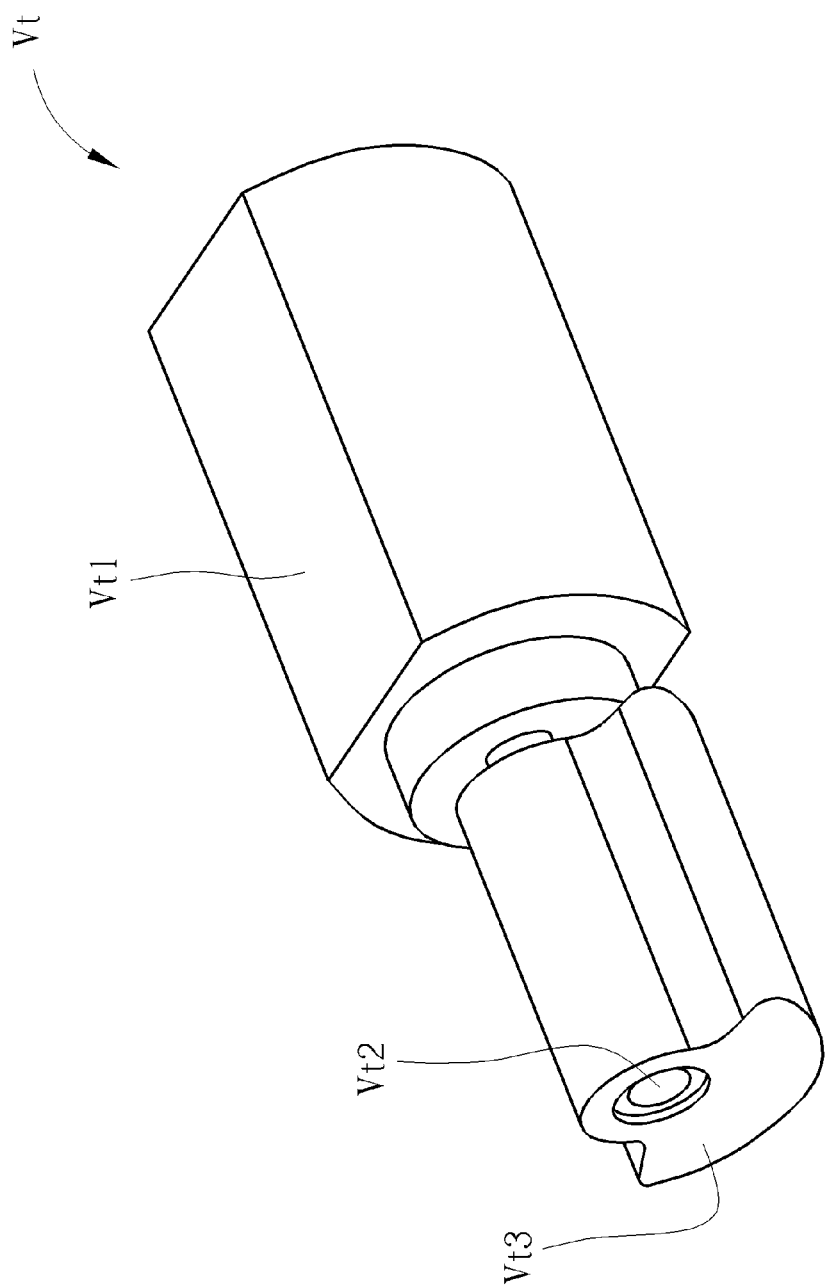
FIG. 6 illustrates a physical appearance of a vibrator according to an embodiment of the present invention.

FIG. 6 illustrates a physical appearance of a vibrator Vt according to an embodiment of the present invention. The mentioned vibrators shown in FIGS. 1 to 5 maybe (but not limited to) the vibrator Vt shown in FIG. 6. The vibrator Vt maybe a motor vibrator including a main part Vt1 (including a drive motor), a vibrator shaft Vt2 and a rotational part Vt3. When operating the vibrator Vt to vibrate, the drive motor of the main part Vt1 drives the vibrator shaft Vt2 to spin so as to spin the rotational part Vt3. Since the center of mass of the rotational part Vt3 is designed to be asymmetrical, the vibrator Vt vibrates when the rotational part Vt3 is driven to spin in high speed. For example, the vibrator Vt may be (but not limited to) a GS3200 motor vibrator manufactured by AWA company which has specification as followings: 0.9 gram weight, 2.3-3.6 volt operation voltage, 3.0 volt rated voltage and vibration force 0.4G*100 grams. The mentioned GS3200 motor vibrator is merely taken for an example, and users may select appropriate other vibrators according to application.

Figure 7:
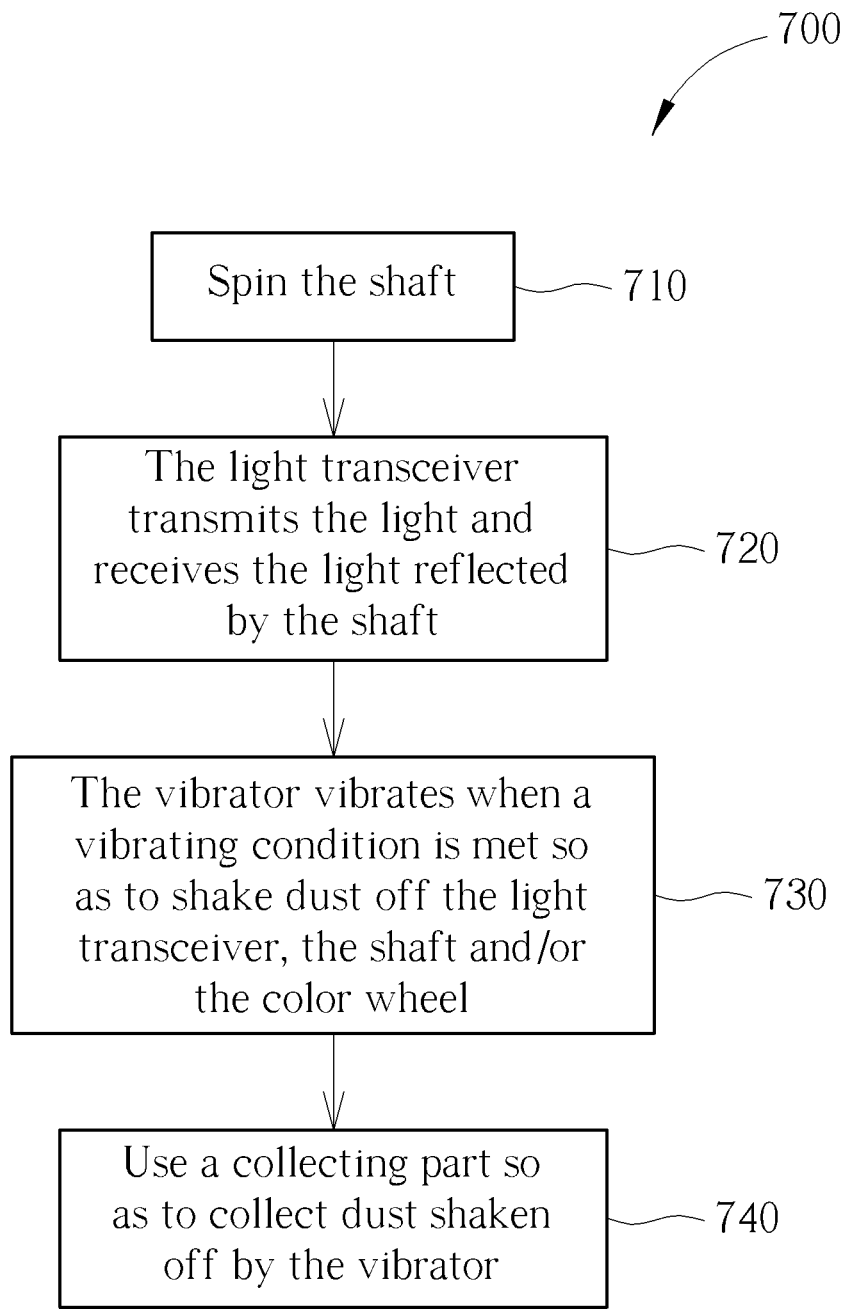
FIG. 7 illustrates a flow chart of a dust removing method according to an embodiment of the present invention.

FIG. 7 illustrates a flow chart of a dust removing method 700 according to an embodiment of the present invention. The method disclosed in FIG. 7 may be read with referring to the projector 100 shown in FIG. 1. The dust removing method 700 includes following steps.

Step 710: spinning the shaft 110;

Step 720: the light transceiver S1 transmitting the light L and receiving the light L reflected by the shaft 110;

Step 730: the vibrator V1 vibrating when a vibrating condition is met so as to shake dust off the light transceiver S1, the shaft 110 and/or the color wheel C1; and Step 740: using a collecting part 180 so as to collect dust shaken off by the vibrator V1.

The said vibrating condition may include operating the color wheel module CM of the projector 100 for a predetermined amount of time (e.g. 100 hours), operating the projector 100 for a predetermined number of times (e.g. 150), the projector 100 occurring an incorrect operation (e.g. the light transceiver S1 receiving no reflecting light after the shaft 110 has spun for fifty laps), the projector receiving an instruction from a user (e.g. a user pressing a "vibrating to clean dust" functional key on the projector 100), and/or a predetermined time amount of time (e.g. 120 hours) elapsing since the vibrator V1 operated.

The projector and dust removing method disclosed by embodiments of the present invention may solve the problem occurring easily in areas with serious air pollution and related to incorrect operations of the light sensor caused by dust landing on the color wheel module. According to a practical measurement, after covering the color wheel module by using JIS Kanto loam class 7 (test powder in which each particle having 27 um-31 um diameter in median) and then cleaning the color wheel module by operating the vibrator for 30 seconds, more than 90% of the test powder (for simulating dust) was shaken off the color wheel module. Regarding the durability of the color wheel module, after the vibrator vibrated continuously for 8 hours, the color wheel module can still operate normally in all functions according to an experiment. Since the purchase price of a vibrator is quite low (e.g. merely 0.6 U.S. dollars each according to quoted price of 2014), and the dust cleaning effect by using a vibrator is significant, the projector and method disclosed by embodiments of the present invention provide a solution of low cost, high performance, high reliability and high feasibility for cleaning dust on the color wheel module and are beneficial for the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
 a color wheel module comprising:
   a color wheel comprising multiple color-filtering areas configured to provide multiple colors of light;
   a shaft connected to the color wheel, configured to drive the color wheel to spin, comprising a reflecting surface and a mark;
   a fixing part disposed corresponding to the shaft;
   a light transceiver set on the fixing part, configured to emit light and receive the light reflected by the shaft; and
   a vibrator set on the fixing part, configured to vibrate when meeting a vibrating condition so as to shake off dust on the color wheel, the shaft and/or the light transceiver; and
 a processing unit coupled to the light transceiver, configured to analyze a spinning angle of the color wheel according to the light received by the light transceiver.

2. The projector of claim 1, further comprising a dust collecting part configured to collect the dust shaken off by the vibrator.

3. The projector of claim 2, wherein the dust collecting part is a recession, a hole, an adhesive part and/or a dust-sucking device.

4. The projector of claim 1, wherein the fixing part comprises a first surface and a second surface, wherein a first distance between the first surface and a ground is longer than a second distance between the second surface and the ground, and the vibrator is set on the first surface.

5. The projector of claim 1, further comprising a first side being closest to a ground, wherein the fixing part is set on a side being different from the first side.

6. The projector of claim 1, wherein the vibrating condition comprises:
 operating the projector for a predetermined amount of time, operating the projector for a predetermined number of times, the projector occurring an incorrect operation, the projector receiving an instruction from a user, and/or a predetermined time amount of time elapsing since the vibrator operated.

7. The projector of claim 1, wherein the vibrator is a motor vibrator.

8. A method configured to clean dust on a color wheel module, the color wheel module comprising a fixing part, alight transceiver, a shaft, a color wheel and a vibrator, the light transceiver set on the fixing part, the shaft comprising a reflecting surface and a mark, the color wheel connected to the shaft, the vibrator set on the fixing part, the method comprising:
 spinning the shaft;
 the light transceiver transmitting light and receiving the light reflected by the shaft; and
 the vibrator vibrating when a vibrating condition is met so as to shake dust off the light transceiver, the shaft and/or the color wheel;

wherein the reflecting surface has a first reflectivity, the mark has a second reflectivity being lower than the first reflectivity.

9. The method of claim 8, wherein the vibrating condition comprises:
   operating the projector for a predetermined amount of time, operating the projector for a predetermined number of times, the projector occurring an incorrect operation, the projector receiving an instruction from a user, and/or a predetermined time amount of time elapsing since the vibrator operated.

10. The method of claim 8, further comprising:
    using a collecting part so as to collect dust shaken off by the vibrator.

* * * * *